Oct. 18, 1960  R. E. HARRINGTON  2,957,108
LIGHT GENERATION SYSTEM USING RECTANGULAR ELECTRODE
Filed May 6, 1957
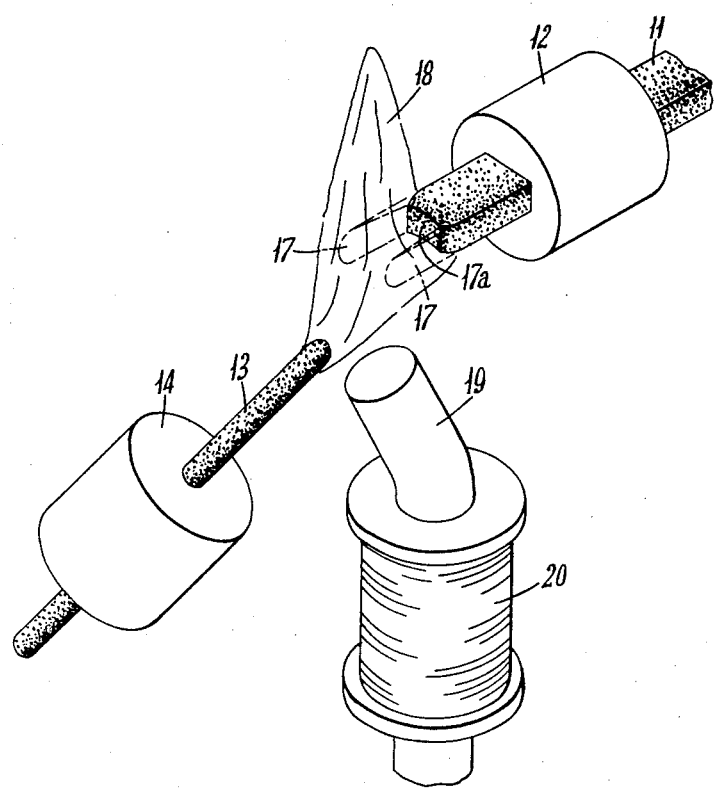
INVENTOR.
ROGER E. HARRINGTON
BY
ATTORNEY

United States Patent Office 2,957,108
Patented Oct. 18, 1960

2,957,108

LIGHT GENERATION SYSTEM USING RECTANGULAR ELECTRODE

Roger E. Harrington, Lakewood, Ohio, assignor to Union Carbide Corporation, a corporation of New York Filed May 6, 1957, Ser. No. 657,200

2 Claims. (Cl. 315—347)

This invention relates to improved process and apparatus for the generation of light using a high intensity arc having a rectangular electrode. More particularly, the invention is concerned with the prevention or elimination of "ear" protrusions which tend to form on the side walls of such rectangular electrodes due to uneven heating and consumption. Rectangular electrodes are used in wide angle light generation and projection systems such as motion pictures, searchlights, and the like.

Round electrodes have been used in motion picture light generation systems for many years. The crater image produced by an optical system using such electrodes is circular, while the film aperture for standard sized screens is rectangular with a 4:3 width-to-height ratio. This difference in shape partially accounts for the low light transmission of the standard aperture, i.e. about 25 percent. Projection of wide angle film, having a much larger width-to-height ratio of approximately 2:1, results in a still lower aperture transmission and at the same time requires an increase in the electrode size for adequate coverage of the aperture. Rectangular electrodes of the proper width-to-height ratio provide a method of matching the crater image with the necessary aperture shape, thus appreciably reducing the light transmission loss.

Unfortunately, when a high intensity electric arc is maintained between a relatively wide rectangular electrode and a second electrode, the rate of heat transfer to the outer sides of the rectangular electrode is lower than the heat transfer rate to the center core of such electrode. Consequently, the outer sides do not burn away as rapidly as the core, and long ear protrusions are formed on the sides which seriously reduce the total light output of the arc. By the present invention, a method is provided whereby such protrusions are substantially removed or their formation is substantially prevented. As employed herein, the term "outer sides" refers to those sides of the rectangular electrode which, in the absence of the method of the present invention, burn back slowly relative to the rate of burnback of the rest of the electrode, thus forming ear protrusions.

In accordance with the present invention, a light generation system is provided which includes a rectangular electrode and a second electrode positioned therefrom. A high intensity electric arc is established between such electrodes as a light source and the rate of burning the outer sides of the rectangular electrode is increased relative to the center core of such electrode so as to substantially prevent the formation of ear protrusions on such electrode side. This in turn increases the light output of the arc in the directions previously blocked by the ears.

According to the invention, an electromagnet having a magnetic coil and alternating current means is positioned adjacent to the electrodes. When a high intensity direct current electric arc is established between the electrodes as a light source and alternating current is passed through the magnetic coil, the resulting magnetic field interacts with the magnetic field produced by the arc current so as to alternately deflect such arc towards the protrusion on either outer side of the rectangular electrode. This deflection tends to concentrate heat at the protrusions and substantially remove them, thereby increasing the light output.

The single figure in the accompanying drawing is a perspective view of a light generation system embodying the principles of the invention.

Referring now to the single figure in the drawing, the rectangular carbon electrode 11 is held in a water-cooled positive current jaw 12, and round carbon electrode 13 is held in water-cooled negative current jaw 14 with a suitable gap between such electrodes. An electromagnet is positioned between such electrodes. This electromagnet includes a concentrically positioned magnetic coil 20 and alternating current means thereto (not illustrated). When the electric arc is established between the electrodes 11 and 13, and alternating current is passed through magnetic coil 20, the resulting magnetic field interacts with the magnetic field produced by the arc current so as to alternately deflect the arc towards the ear protrusions 17 on either side of the rectangular electrode 11. This deflection tends to concentrate heat at the protrusions and increase their burning rate, thereby re-establishing the preferred concave crater contour.

A series of tests were performed which emphasize the advantages of the magnetic field embodiment of the invention. In these tests, an 8 x 16 mm. rectangular carbon was used as the positive electrode, and a standard carbon rod served as the negative electrode. With the rectangular carbon burned in obtaining the following data, the ear protrusions were reduced from 1¼" to ⅜" when the magnetic field was turned on with an arc current of 250 amperes.

*Table I*

| Arc Current | Arc Voltage | Average Crater Brightness (Candles/mm.²) | A.C. Magnetic Field |
|---|---|---|---|
| 161 | 55 | 177 | off. |
| 197 | 63 | 441 | off. |
| 236 | 67 | 597 | off. |
| 250 | 71 | 670 | off. |
| 176 | 60 | 259 | on. |
| 227 | 68 | 541 | on. |
| 248 | 69 | 657 | on. |
| 292 | 70 | 743 | on. |

In addition to reducing the side wall protrusions, the alternating current field also increases the quantity of current that a rectangular carbon will carry without overloading. This higher current produces a higher maximum brightness. Table II shows the factor by which the alternating magnetic field raised the current capacity and resultant brightness. This effect was demonstrated with three different core materials compositions.

*Table II*

| Core Composition | Factor for Increase in Current Capacity | Factor for Increase in Average Brightness |
|---|---|---|
| A | 1.21X | 1.16X |
| B | 1.17 | 1.11 |
| C | 1.40 | 1.27 |

Thus, the addition of the alternating current magnetic field was found to increase the brightness attainable by 25 percent or more. In each case listed, arc current was limited by the power supply, and actual current limits are probably somewhat higher.

Although the present embodiment of the invention has been described in detail, it is contemplated that modifications of the process and apparatus may be made within the spirit of the invention and the scope thereof as set forth in the claims. For example, although direct current was used to maintain the arc in the previously described tests, alternating current could also be used in which case both electrodes could be rectangular compounds. It is to be noted that if an alternating arc is used, it would be necessary to utilize direct current in the magnetic coil 20.

A further practical modification is the use of multiple negative electrodes.

What is claimed is:

1. A light generation system comprising a rectangular electrode, at least one second electrode positioned therefrom, means for establishing a high intensity electric arc between such electrodes as a light source, an electromagnet having a magnetic coil and alternating current means thereto, said electromagnet being positioned so that the alternating current passing through the magnet coil produces a magnetic field which alternately deflects the arc towards either outer side of said rectangular electrode so as to substantially prevent the formation of ear protrusions on such electrode sides and increase the quantity of light output from the arc.

2. A light generation system comprising a rectangular electrode which comprises a center carbon core impregnated with rare-earth metal compounds surrounded by a carbon shell, at least one second electrode positioned therefrom, means for establishing a high intensity electric arc between such electrodes as a light source, an electromagnet having a magnetic coil and alternating current means thereto, said electromagnet being positioned so that the alternating current passing through the magnet coil produces a magnetic field which alternately deflects the arc towards either outer side of said rectangular electrode so as to substantially prevent the formation of ear protrusions on such electrode sides and increase the quantity of light output from the arc.

References Cited in the file of this patent

UNITED STATES PATENTS

| | | |
|---|---|---|
| 571,463 | Thomson | Nov. 17, 1896 |
| 743,237 | Bremer | Nov. 3, 1903 |
| 1,029,787 | Beck | June 18, 1912 |
| 2,107,148 | Gretener | Feb. 1, 1938 |
| 2,277,806 | Wells | Mar. 31, 1942 |
| 2,457,042 | Hickman | Dec. 21, 1948 |
| 2,540,256 | Gretener | Feb. 6, 1951 |
| 2,850,665 | Walcher | Sept. 2, 1958 |

FOREIGN PATENTS

| | | |
|---|---|---|
| 10,808 | Great Britain | May 7, 1900 |
| 167,240 | Australia | Mar. 14, 1956 |
| 887,844 | Germany | Aug. 27, 1953 |

UNITED STATES PATENT OFFICE
CERTIFICATE OF CORRECTION

Patent No. 2,957,108                  October 18, 1960

Roger E. Harrington

It is hereby certified that error appears in the printed specification of the above numbered patent requiring correction and that the said Letters Patent should read as corrected below.

Column 3, lines 8 and 9, for "could be rectangular compounds" read -- would be rectangular carbons --.

Signed and sealed this 11th day of April 1961.

(SEAL)

Attest:
ERNEST W. SWIDER
Attesting Officer

ARTHUR W. CROCKER
Acting Commissioner of Patents